United States Patent Office 3,384,618
Patented May 21, 1968

3,384,618
METHOD OF PRODUCING SYNTHETIC RESINS FROM AROMATIC GLYCOLS AND A PHENOL
Minoru Imoto, 181–2 Okashin-machi, Osaka-fu, and Chingyun Huang, 249 Okashin-machi, Osaka-fu, both of Maikata-shi, Japan
No Drawing. Continuation-in-part of application Ser. No. 375,620, June 16, 1964. This application Dec. 8, 1966, Ser. No. 600,700
Claims priority, application Japan, Nov. 24, 1960, 35/46,581
9 Claims. (Cl. 260—47)

ABSTRACT OF THE DISCLOSURE

There is provided a method of producing a synthetic resin which comprises reacting a material selected from the group consisting of aromatic glycols having the formula

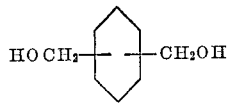

and polyethers thereof having the formula

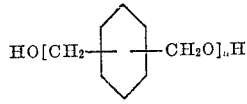

wherein

is an aromatic hydrocarbon moiety selected from the group consisting of benzene, napthalene and anthracene, each having up to four methyl substituents on the aromatic nucleus, and $n$ is an integer from 2 to about 200, with a phenol selected from the group consisting of phenol, ortho-, meta- and para-cresols, para-tert-butylphenol, octylphenols, nonylphenols, phenylphenols, p-chlorophenol, hydroquinone, resorcinol, catechol, bisphenol, 8-(para - hydroxyphenyl) - para-menthane - 1,1,8-di(para-hydroxyphenyl)-para-menthane and novolac resins which are the reaction product of any of the foregoing phenols and formaldehyde and having a molecular weight of about 250 to 900, thereby to form a synthetic resin in which aromatic hydrocarbon moieties and phenol moieties are alternately bonded by methylene radicals. The synthetic resins produced are novel in their alternation of phenolic and non-phenolic moieties linked by methylene radicals.

---

This application is a continuation-in-part of application Serial No. 375,620, filed June 16, 1964 and now abandoned and which in turn was a continuation-in-part of application Serial No. 153,687, filed November 20, 1961, and now abandoned.

This invention relates to new synthetic resin compositions, to resin products which have highly desirable properties produced therefrom, and to a process of producing the new synthetic resin compositions. More particularly, this invention relates to the new compositions and method of production of resins which results from the reaction of an aromatic glycol or its polyether with a phenol or with the first-stage formaldehyde condensate of a phenol resin, the latter also being considered a phenol in the present application.

It is an object of this invention to provide novel resin compositions having highly desirable properties. It is also an object of this invention to produce a new synthetic resin from which products having useful properties and multiple utility can be made. In addition, it is an object of this invention to provide a simple and economic process for the production of the new synthetic resins.

These and other objects will become apparent from the following description of the invention.

The novel resins are produced by the reaction of an aromatic glycol or a polyether thereof with a phenol. Aromatic glycols and polyethers thereof differ from aliphatic glycols in chemical properties in that they can be made to condense at the functional positions of a phenol by the action of heat or by the action of heat together with the catalytic action of an acid.

Aromatic glycols employed in the present invention have the formula

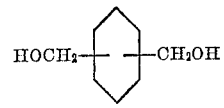

wherein

is an aromatic hydrocarbon moiety selected from the group consisting of benzene, napthalene and anthracene, each having up to four methyl substituents on the aromatic nucleus. Polyethers of the foregoing aromatic glycols employed in the present invention have the formula

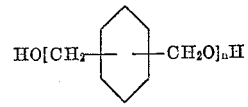

wherein

is as defined above and $n$ is an integer from 2 to about 200.

The polyether resins of the aromatic glycols are readily obtained by subjecting the aromatic glycol to polycondensation by dehydration. The self-condensation of an aromatic glycol is usually effected by heating the respective glycol to above 180° C. in the presence of an acid catalyst. Thereby, a polyaromatic glycol or a polyether of the aromatic compound is obtained.

Polyaromatic glycols (polyethers) are employed in the present invention wherein $n$ is an integer from 2 to about 200.

When aromatic glycols are employed there is a direct condensation between the methylol groups and the functional positions of the phenol, whereas when the polyether of an aromatic glycol is used, only the end methylol groups can condense directly; however, the ether links are broken during the reaction and the newly generated methylol groups then condense at the functional sites of the phenol. The final product is the same whether an aromatic glycol or a polyether of an aromatic glycol is employed.

Phenols employed in the present invention are selected from the group consisting of phenol, ortho-, meta- and para-cresols, para-tert-butylphenol, octylphenols, nonylphenols, phenylphenols, p-chlorophenol, hydroquinone, resorcinol, catechol, bisphenol, 8-(para-hydroxyphenyl)-para-menthane-1, 1,8-di(para-hydroxyphenyl)-para-menthane and novolac resins which are the reaction product of any of the foregoing phenols and formaldehyde and having a molecular weight of about 250 to 900. It is to be noted that in the present invention the aforesaid novolac resins are simply considered to be phenols.

The novolac resins are obtained in the usual way by the reaction of a phenol or mixture of phenols with formaldehyde in molar ratio of the order of 1 mol of phenol to about 0.75 to 1.5 mols of formaldehyde and in the presence of an acid catalyst such as hydrochloric acid, oxalic acid, and salts of bivalent metals such as the chlorides, sulfides and acetates of zinc, magnesium, lead, cadmium, manganese, cobalt, barium and tin. When metallic salts are used to catalyze the phenol-formaldehyde condensation, the amount of metallic salt employed as a catalyst for the novolac resin should be about 1% or less by weight based on the weight of the reactants, inasmuch as novolac resins which are prepared with metallic salts, upon reaction with an aromatic glycol have a very fast hardening velocity, that is a hardening velocity which is about three or four times faster than that of novolac which is produced in the absence of salts.

The reaction of the aromatic glycol with a phenol or phenol-formaldehyde condensate is accomplished by heating the reactants to a temperature of about 80° C. to 250° C. Using heat alone to effect the condensation, in the absence of a catalyst, the reaction is very slow at a temperature below about 150° C. and, accordingly, a temperature in the range of about 150° C. to 250° C. is employed.

Up to 1% of an acid catalyst may be used in effecting the aromatic glycol-phenol condensation reaction. Any acid-type compound in concentration as low as 0.001% will catalyze the condensation reaction, for example inorganic acids such as hydrogen halides, phosphoric acid, perchloric acid, and sulfuric acids can be used as well as metallic chlorides and any salt of divalent and trivalent metals. Organic sulfonic acids are effective catalysts for the reaction since they have particularly good dispersibility in the reaction mixture, for example benzene sulfonic acid having up to five lower-alkyl substituents on the aromatic nucleus and naphthalene sulfonic acid having up to four lower-alkyl substituents on the aromatic nucleus and especially organic sulfonic acids which have the same aromatic structure as the aromatic, residual-radical of the aromatic glycol employed in the reaction. Aromatic chloromethyl compounds such as benzyl chloride having up to five lower-alkyl substituents on the benzene nucleus, and xylylene dichloride which has up to four lower-alkyl substituents on the aromatic nucleus are also particularly effective catalysts for the reaction.

The chemical structure of the resin produced by the condensation of a phenol and an aromatic glycol each as described above is a network of an alternate phenol and an aromatic hydrocarbon bonded together directly by methylene. Therefore, the number of phenolic hydroxyl groups of the resin product prepared by the reaction hereinbefore described is low compared to the number of hydroxyl groups of an ordinary phenol resin, with the result that the water resistance and electrical insulation properties of the resin of this invention are particularly high as is illustrated in the following table:

| | High insulation phenol resin | The resin prepared as in Example 1 |
|---|---|---|
| Normal insulation resistance (MΩ) | $10^5$–$10^6$ | $10^7$–$10^8$ |
| Insulation resistance after boiling (MΩ) | $10^4$–$10^5$ | $10^6$–$10^7$ |
| Dielectric strength | 13 and up | 25. |
| Effect of alkali: | | |
| 2% solution 60° C. (2 hrs.) | Attack | None. |
| 5% solution 30° C. (2 hrs.) | do | Do. |

From theoretical considerations of the resin structure, the mol ratio of the reactants should be close to 1:1, however, satisfactory products are obtained in which the ratio of the reaction is of the order of 1 mol of aromatic glycol to about 0.75 to 1.25 mols of phenol.

The synthetic resins produced by the present invention have molecular weights of at least 5000.

Broadly speaking, the theoretical type of reaction according to the present invention is divided into the reaction of aromatic glycol polyether and phenols and that or aromatic glycol and phenols, as follows:

(1) In the reaction of phenols and methylol radical of aromatic glycol or methylol radical which is existing at both extreme ends of aromatic glycol polyether, a resin product is obtained by dehydration through acid catalysis as well as by polycondensation, An example is given hereinbelow:

(A)

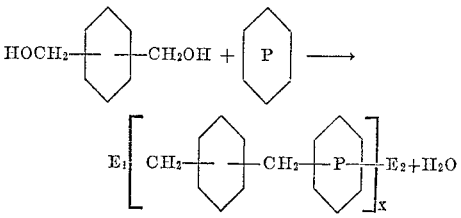

wherein

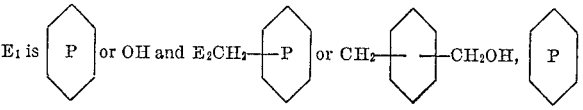

being a phenol (on the reactants side of the equation) or the moiety thereof (on the product side of the equation) selected from the group consisting of phenol, ortho-, meta- and para-cresols, para-tert-butylphenol, octylphenols, nonylphenols, phenylphenols, p-chlorophenol, hydroquinone, resorcinol, catechol, bispenol, 8-(para-hydroxyphenyl)-para-menthane-1, 1,8-di(para-hydroxyphenyl)-para-menthane and novolac resins which are the reaction product of any of the foregoing phenols and formaldehyde and having a molecular weight of about 250 to 900.

(B)

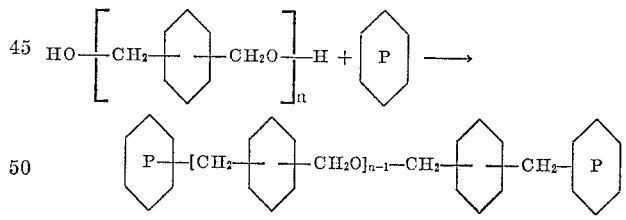

wherein

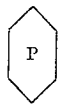

is a phenol (on the reactants side of the equation) or the moiety thereof (on the product side of the equation) selected from the group consisting of phenol, ortho-, meta- and para-cresols, para-tert-butylphenol, octylphenols, nonylphenols, phenylphenols, p-chlorophenol, hydroquinone, resorcinol, catechol, bispenol, 8-(para-hydroxyphenyl)-para-menthane-1, 1,8-di(para-hydroxyphenyl)-para-menthane and novolac resins which are the reaction product of any of the foregoing phenols and formaldehyde and having a molecular weight of about 250 to 900.

In this case, the resin product is obtained upon reaction of 1 mol of aromatic glycol and 0.75–1.25 mols of phenol.

(2) Even after the reaction has been taken place between both extreme ends of aromatic glycol polyether and phenol, if the ether links in the principal chain of polyether exist in a state of non-reaction or excess in number which is more than that of phenol to be reacted with methylol radical, the ether links easily break to cause the following reaction.

(C)

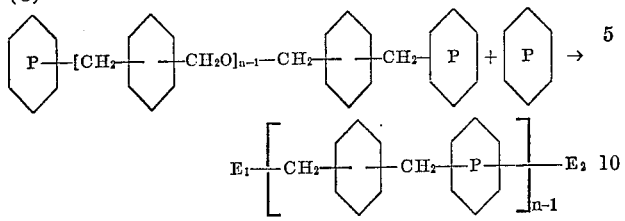

wherein all the symbols are as defined above and $n-1=x$.

Consequently, the reaction can be carried out with a wide range of mol ratio which is from 1 mol of aromatic glycol polyether to 1 mol of phenol or 1 mol of polyether monomer

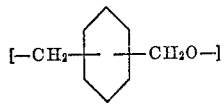

In other words, the reaction in the above (C) ultimately results in giving the final structure which is same as that of (A).

The resins of the invention can be used for many industrial products and especially for products wherein high insulation properties are desirable. The resins can be employed in laminated products, as a molding material, in paints, as the binder in grindstones, brake-shoes and brake linings, as a reinforcement material for rubber, as a water proofing agent, as an adhesive for rubber, as high voltage insulators and the like.

Furthermore, molding materials can be produced by mixing the resins in a soluble and fusible state with fillers such as natural fibers, wood flour, pulp, synthetic fibers, inorganic fibers, and other organic and inorganic fillers. By dissolving the reaction products in a soluble and fusible state in an organic solvent, impregnating paper or fabric with the resulting solution, drying the same, and subjecting the same to heat and pressure, laminated materials can be made.

When the condensation reaction between the aromatic glycol and the phenol is conducted with an excess of the phenol beyond what is stoichiometrically required to produce a linear resin, a cross-linked or thermoset resin is obtained. The above referred to alternating character of the resin, however, is, of course, maintained, even in the cross-links. Unlike each molecule of a linear resin, which has only two termini a cross-linked resin may, of course, have more than two termini due to branching. The identity of the terminal groups, however, is, of course, the same as for the linear resins.

In order to indicate still more fully the nature and details of the present invention, the following examples of typical procedures for producing these new synthetic resins are set forth, it being understood that these examples are presented as illustrative only, and that they are not intended to limit the scope of the invention. In all of these examples, quantities, expressed in terms of parts are based on weight.

EXAMPLE 1

100 parts of polyether of xylene-dimethylol resin (molecular weight 850, softening point 60° C.), 94 parts of phenol, and 0.186 part of meta-xylene sulfonic acid are mixed and heated at 180° C. for one hour. The mixture at first undergoes violent dehydration, then, changing into a state wherein bubbles appear to have been given off, it thermosets. When the resin obtained by thermosetting in this manner is ground to 80-mesh grain size and subjected to heat extraction for four hours with an 80:20 liquid mixture of benzene and acetone, it exhibits an insolubility degree of 98.1%. The degree of insolubility after the hardening was same in both the following results:

(a) The results obtained by carrying out extraction of the hardened product with acetone in accordance with the process of ASTM–D–496–46.

(b) The result obtained by using a mixture of 20 parts of benezene and 80 parts of acetone. However, with this solvent mixture an absolute value is reached in a period of time remarkably shorter than in the case of ASTM–D–496–46. Accordingly, hereinafter a solvent mixture consisting of 80 parts of acetone and 20 parts of benzene is employed for the degree of insolubility determinations.

EXAMPLE 2

100 parts of polyether of xylene-methylol (described in Example 1), 77 parts of p,p'-dihydroxydiphenylpropane, and 0.171 part of para-toluene sulfonic acid are mixed and subjected to the same heating as described in Exmple 1. A resin exhibiting an insolubility degree of 99.8% is obtained.

EXAMPLE 3

(a) Preparation of the novolac resin.—1300 parts of phenol, 130 parts of water, 1145 parts of 30% conc. formalin, and 6.5 parts of oxalic acid are heated and mixed in a reaction vessel. The mixture is then caused to boil, after which it is made to reflux for 60 minutes. Next, 35 parts of 15% conc. hydrochloric acid are added gradually to the mixture and then it is made to reflux again for 35 minutes. After completion of the reaction, 400 parts of water are poured onto the mixture to cool its reaction temperature to 75° C.; thereafter the separated water is removed and the reaction product is dehydrated at normal (atmospheric) pressure. The resin produced becomes transparent immediately at a temperature of 100° C. and the dehydration-concentration is continued up to a temperature of 115° C. Thus, 1400 parts of novolac resin, having a molecular weight of 850 and a melting point of 65° C., are obtained.

(b) Reaction of the novolac resin and a glycol to form a phenol-aromatic hydrocarbon resin of the invention.—100 parts of polyether of xylene-dimethylol, 85 parts of the novolac, and 0.15 part of meta-xylene sulfonic acid are mixed and subjected to the same heat treatment as described in Example 1. A resin exhibiting an insolubility degree of 99.2% is obtained.

EXAMPLE 4

(a) Preparation of the novolac resin.—949 parts of phenol, 126.5 parts of 37% conc. formalin, and 3.2 parts of zinc white are mixed and boiled at a temperature of 113° C.–115° C., in the course of which 55 parts of 37% conc. formalin and 2.7 parts of zinc white are added and reaction is continued for 2.5 hours. Next, the phenol that has not reacted is removed by vapor distillation. After cooling, the zinc white in the mixture is decomposed by hydrochloric acid of 10% concentration, the mixture is rinsed with water, and the water contained therein is removed at reduced pressure, whereby 245 parts of novolac resin, having a molecular weight of 350 and a melting point of 65° C. are obtained.

(b) Reaction of the novolac resin and a glycol to form a phenol-aromatic hydrocarbon resin of the invention.—100 parts of polyether of xylene dimethylol (molecular weight 850, softening point 60° C.), 85 parts of the novolac (molecular weight 350, softening point 65° C., 0.15 part of meta-xylene sufonic acid, and 0.5 part of stearic acid are heated and mixed by means of aqueous steam for 30 minutes. After the reaction, 120 parts of paper pulp are added to the mixture, which is then subjected to a further 20 minutes of heat reaction by means of hot rolls at 120° C. Then, the resulting resin-pulp substance is ground to 100-mesh grain size to produce a molding material.

EXAMPLE 5

(a) Preparation of the novolac resin.—94 parts of phenol, 150 parts of 30% conc. formalin and 9.4 parts of Ba(OH)$_2$·8H$_2$O are placed together in a reaction vessel and caused to react at 70° C. for 5 hours. The product obtained is further condensed at a reduced pressure and at a temperature not exceeding 70° C. to reduce the water content in the resin to below 5%. The water content is determined by drawing out a sample product during the vacuum condensation and warming the specimen at 115° C. for 30 minutes. When the water content reaches 5% or less, methanol is added to the condensate so as first to obtain a 60% solids mixture and then more methanol is added to dissolve the novolac.

(b) Reaction of the novolac resin and a glycol to form a phenol-aromatic hydrocarbon resin of the invention.— A resolution of 100 parts of polyether of xylene-dimethylol, 0.19 part of meta-xylene sulfonic-acid, and 90 parts of the novolac dissolved in 150 parts of methanol is reflux heated for 30 minutes, then caused to impregnate paper or fabric until the resin content is 50%. Upon drying, the impregnated paper or fabric becomes a base material for laminated products, which can be made by subjecting the said base material to heat forming under a pressure of 200 kg./cm.$^2$ and a temperature of 180° to 190° C. for one hour.

EXAMPLE 6

130 parts of phenylenedimethylol, 63 parts of phenol, and 0.183 part of durene-monosulfonic acid are mixed and heated at 180° C. for one hour; the mixture violently releases water and assumes a state wherein bubbles appear. This substance is treated as in Example 1 and a resin of 92% insolubility degree thereby is obtained.

EXAMPLE 7

(a) Preparation of the novolac resin.—2000 parts of 2,2′-dihydroxydiphenylmethane, 400 parts of 37% conc. formalin and 1.5 parts of hydrochloric acid are placed in a reaction vessel, and are boiled and refluxed for one hour to react. After the reaction, 1000 parts of water is added and the separated water is then removed. The reaction product is then concentrated by dehydration at normal pressure; 2000 parts of novolac resin, having molecular weight of 330 and melting point of 75° C.–80° C., is obtained.

(b) Reaction of the novolac resin and a glycol to form a phenol-aromatic hydrocarbon resin of the invention.— 161 parts of polyether of S-mesithylenedimethylol (oxygen content 12.4%, molecular weight 1,480), 460 parts of the novolac (melting point 75–80° C., molecular weight 330), and 0.6 part of para-toluene sulfonic acid are ground and mixed, then heated at 100° C. for 50 minutes, the mixture violently releases water and is transformed into a semitransparent resin of amber color.

58 parts of this resin, 30 parts of wood flour (dehydrated), 2 parts of hexamethylenetetramine, 2 parts of magnesia, and 1 part of magnesium stearate are kneaded at 100° to 110° by means of hot rolls, then ground in a ball mill to produce a molding powder. Thermoset molded articles are made by heating this material in a mold at 160° to 170° under a pressure of 200 kg./cm.$^2$.

EXAMPLE 8

176 parts of polyether of durene-dimethylol (molecular weight 1,850, oxygen content 11.9%) is dissolved in 500 parts of benzene, and then 62 parts of phenol and 0.5 part of xylene sulfonic acid are added into this solution, with mixing until a uniform solution is obtained. The benzene is evaporated off under atmospheric pressure, then subsequently under reduced pressure, and the residue is heated continuously for 30 minutes at 110° C. After the reaction, the substance produced is taken out and kneaded together with 100 parts of pulp. The substance thus obtained is ground to produce a molding powder. This molding powder has excellent plastic flow and, accordingly, is highly suitable for large-size moldings. Thermoset resin molded articles exhibiting a degree of hardening of 95% are obtained from this molding powder by molding it at 170° C. temperature and 150 kg./cm.$^2$ pressure for 15 minutes.

EXAMPLE 9

188 parts of naphthalenedimethylol, 150 parts of para-tertiary-butylphenol, and 0.8 part of para-toluene sulfonic acid are mixed and heated over an oil bath, at first at 120° C. for one hour, then at 140° C. for one hour, and finally at 150° C. for 30 minutes; a transparent, amber-colored resin of 110° C. melting point is obtained. This resin dissolves readily in natural or synthetic rubber and drying oils and is excellent as an agent for producing tackiness in rubber, as a rubber adhesive, and as resin for enamels. In the place of the catalyst used in Example 1, 0.36 part of zinc chloride is used and the other conditions remain the same as those in Example 1. The resin obtained exhibits an insolubility degree of 94.5%.

EXAMPLE 10

In the place of the catalyst used in Example 1, 0.36 part of zinc chloride is used and the other conditions remained the same as those in Example 1. A hardened resin exhibiting an insolubility degree of 94.5% is obtained.

EXAMPLE 11

In the place of the catalyst used in Example 1, 0.32 part of dimethylxylylene dichloride is used and the reaction is carried out under the same conditions as in Example 1. A resin exhibiting an insolubility degree of 93.3% is obtained.

EXAMPLE 12

100 parts of 9,10-dimethylol anthracene, 130 parts of 1,8-di(p-hydroxyphenyl)-para-menthane, and 0.23 part of aluminum chloride are used and the reaction is carried out under the same conditions as in Example 1, whereby a resin exhibiting an insolubility degree of 98.7% is obtained.

In the following example, a polyether is employed as a carrier for the catalyst. The catalyst thereby is more effectively intermixed in the system. Furthermore, there is no contamination problem because the carrier reacts to become part of the resinous product.

EXAMPLE 13

(a) Preparation of catalyst.—100 parts of polyether (molecular weight 580, melting point 46° C.) of dimethylol benzene is heated at 60° C., hydrogen chloride is passed therethrough; the heated polyether absorbs 11.5% of hydrogen chloride to become saturated therewith.

(b) Reaction of the polyether and resorcinol to form a resorcinol-aromatic hydrocarbon resin.—50 parts of polyether of benzene (molecular weight 880 melting point 75–82° C.), 90 parts of resorcinol and 1.0 part of the polyether-carried hydrogen chloride catalyst are mixed and this mixture is heated at 160° C. for one hour, whereby a polymer resin exhibiting an insolubility degree of 98.5% is obtained.

EXAMPLE 14

168 g. (1 mol) of 1,3,5-trimethylol benzene, 108 g. (1 mol) of para-cresol and 0.5 g. of para-toluene sulfonic acid are mixed and thereafter reacted by being heated over an oil bath under the same conditions as in Example 9, whereby a resin of light yellow color with a melting point at 110° C. is obtained. This resin is effective as a vulcanizing hardener for butyl rubber.

EXAMPLE 15

198 g. of 1,2,4,5-tetramethylol benzene, 122 g. of 1,3,5-xylenol, and 0.3 g. of meta-xylene sulfonic acid are mixed, thereafter reacted by being heated over an oil bath at a temperature of 100° C. and at a reduced pressure of 100 mm. for three hours, and then dehydrated and cooled to 60° C. To the resultant resin is added 100 cc. of a mixed solvent composed by acetone:methanol (4:1) to make a solution. To this resin solution are added asbestos and filler to turn it into a pasty form which is used in brake lining molding as the brake lining base or binder. This resin has excellent thermal resistance.

It is noted that hereinabove the polyether of a glycol, employed according to the invention, is frequently referred to simply as a glycol because, as pointed out above, in the present invention it is functionally equivalent to a glycol.

Although this invention has been described with respect to particular embodiments thereof, it is not to be so limited, as changes and modifications may be made therein which are within the full intended scope of the invention as defined by the appended claims.

What we claim and desire to secure by Letters Patent is:

1. A method of producing a synthetic resin which comprises reacting a material selected from the group consisting of aromatic glycols having the formula

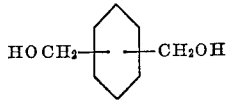

and polyethers thereof having the formula

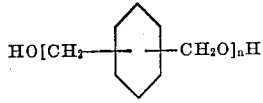

wherein

is an aromatic hydrocarbon moiety selected from the group consisting of benzene, naphthalene and anthracene, each having up to four methyl substituents on the aromatic nucleus, and $n$ is an integer from 2 to about 200, with a phenol selected from the group consisting of phenol, ortho-, meta- and para-cresols, para-tert-butylphenol, octylphenols, nonylphenols, phenylphenols, p-chlorophenol, hydroquinone, resorcinol, catechol, bisphenol, 8-(para-hydroxyphenyl)-paramenthane-1, 1,8-di(para-hydroxyphenyl)-para-menthane and novolac resins which are the reaction product of any of the foregoing phenols and formaldehyde and have a molecular weight of about 250 to 900, at a temperature of about 80° C. to 250° C., thereby to form a synthetic resin in which aromatic hydrocarbon moieties and phenol moieties are alternately bonded by methylene radicals.

2. A method according to claim 1, in which said reaction is conducted by heating the reactants to a temperature in the range of about 150° C. to 250° C.

3. A method according to claim 1, in which said reaction is conducted by intermixing said reactants with an acid catalyst and heating the intermixture to a temperature in the range of about 80° C. to 250° C.

4. A method according to claim 1 wherein said material is a monomeric aromatic glycol.

5. A method according to claim 1 wherein said material is said polyether of said aromatic glycol.

6. A method according to claim 1 wherein said material is reacted with said phenol selected from the group consisting of phenol, ortho-, meta- and para-cresols, para-tert-butylphenol, octylphenols, nonlyphenols, phenylphenols, p-chlorophenol, hydroquinone, resorcinol, catechol, bisphenol, 8-(para-hydroxyphenyl)-para-menthane-1, and 1,8-di(para-hydroxyphenyl)-para-menthane.

7. A method according to claim 1 wherein said material is said novolac resin of said phenol which is selected from the group consisting of phenol, ortho-, meta- and paracresols, para-tert-butylphenol, octylphenols, nonylphenols, phenylphenols, p-chlorophenol, hydroquinone, resorcinol, catechol, bisphenol, 8-(para-hydroxyphenyl)-para-menthane-1, and 1,8-di(para-hydroxyphenyl)-para-menthane.

8. A method of producing a synthetic resin which comprises reacting trimethylol benzene with a phenol selected from the group consisting of phenol, ortho-, meta- and para-cresols, para-tert-butylphenol, octylphenols, nonylphenols, phenylphenols, p-chlorophenol, hydroquinone, resorcinol, catechol, bisphenol, 8-(para-hydroxyphenyl)-para-menthane-1, 1,8 - di(para - hydroxyphenyl)-para-menthane and novolac resins which are the reaction product of any of the foregoing phenols and formaldehyde and have a molecular weight of about 250 to 900, at a temperature of about 80° C. to 250° C., thereby to form a synthetic resin in which aromatic hydrocarbon moieties and phenol moieties are alternately bonded by methylene radicals.

9. A method of producing a synthetic resin which comprises reacting tetramethylol benzene with a phenol selected from the group consisting of phenol, ortho-, meta- and para-cresols, para-tert-butylphenol, octylphenols, nonylphenols, phenylphenols, p-chlorophenol, hydroquinone, resorcinol, catechol, bisphenol, 8-(para-hydroxyphenyl)-para-menthane-1, 1,8-di(para - hydroxyphenyl)-para-menthane and novolac resins which are the reaction product of any of the foregoing phenols and fomaldehyde and have a molecular weight of about 250 to 900, at a temperature of about 80° C. to 250° C., thereby to form a synthetic resin in which aromatic hydrocarbon moieties and phenol moieties are alternately bonded by methylene radicals.

References Cited

UNITED STATES PATENTS

| 1,705,494 | 3/1929 | Novotny et al. | 260—47 |
| 2,433,852 | 1/1948 | Lieber | 260—47 |
| 2,840,542 | 6/1958 | Freeman et al. | 260—58 |
| 2,954,360 | 9/1960 | Krzikalla et al. | 260—47 |
| 3,062,895 | 11/1962 | Martin et al. | 260—619 |
| 3,116,265 | 12/1963 | Huang et al. | 260—42 |

OTHER REFERENCES

Wegler, Agnew. Che. A/60, January 1948, No. 4, pages 88–96.

WILLIAM H. SHORT, *Primary Examiner.*

H. SCHAIN, *Assistant Examiner.*